United States Patent
Mancini et al.

(10) Patent No.: US 6,865,674 B1
(45) Date of Patent: Mar. 8, 2005

(54) DYNAMIC TRUST ANCHOR SYSTEM AND METHOD

(75) Inventors: Adrian O. Mancini, Nepean (CA); Kevin T. Simzer, Gloucester (CA); James Turnbull, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/324,568

(22) Filed: Jun. 2, 1999

(51) Int. Cl.$^7$ .............................................. H04L 9/00
(52) U.S. Cl. ...................... 713/157; 713/169; 713/175; 713/201
(58) Field of Search ................. 713/157, 175, 713/169, 201, 200

(56) References Cited

U.S. PATENT DOCUMENTS

| | | | | | |
|---|---|---|---|---|---|
| 5,315,657 A | * | 5/1994 | Abadi et al. | ................. | 713/201 |
| 5,958,050 A | * | 9/1999 | Griffin et al. | ................ | 713/200 |
| 6,006,332 A | * | 12/1999 | Rabne et al. | ................ | 713/201 |
| 6,105,027 A | * | 8/2000 | Schneider et al. | ............. | 707/9 |
| 6,167,521 A | * | 12/2000 | Smith et al. | ................. | 713/200 |
| 6,189,103 B1 | * | 2/2001 | Nevarez et al. | ............. | 713/201 |
| 6,256,741 B1 | * | 7/2001 | Stubblebine | ................. | 713/201 |
| 6,304,973 B1 | * | 10/2001 | Williams | ..................... | 713/201 |
| 6,304,974 B1 | * | 10/2001 | Samar | ........................ | 713/201 |
| 6,408,336 B1 | * | 6/2002 | Schneider et al. | .......... | 709/229 |
| 6,532,451 B1 | * | 3/2003 | Schell et al. | .................. | 705/54 |

\* cited by examiner

*Primary Examiner*—Albert Decady
*Assistant Examiner*—Kambiz Zand
(74) *Attorney, Agent, or Firm*—Vedder Price Kaufman & Kammholz, P.C.

(57) ABSTRACT

An information security network provides a plurality of trusted authorities configurable in a rooted hierarchical structure. At least one of the trusted authorities is a superior authority and at least one of the trusted authorities are subordinate authorities. The trust authorities are capable of issuing digitally signed data structures, referred to as certificates. The superior authority is operative to generate policy control message data, such as separate message data or a certificate containing policy information, to dynamically vary policy control data to facilitate trust authority policy delegation among subordinate authorities. The policy control data includes, among other things, inter-trusted authority trust modification data to dynamically vary validation starting authorities among subordinate authorities.

18 Claims, 3 Drawing Sheets

DYNAMIC TRUST ANCHOR SYSTEM AND METHOD

CROSS REFERENCE TO RELATED CO-PENDING APPLICATION

This application is related to a co-pending application entitled "Method and Apparatus for Public Key Management" filed on Jul. 25, 1997 having Ser. No. 08/901,054, incorporated herein in its entirety by reference and owned by instant assignee.

FIELD OF THE INVENTION

The invention relates generally to information security systems and more particularly to information security systems employing rooted hierarchical structures of trusted authorities.

BACKGROUND OF THE INVENTION

Information security systems, such as computer network based systems employing public key techniques to encrypt and decrypt data, typically use a certification authority, such as a series of network servers to generate certificates that are used by network nodes or other certificate issuing units, to verify, among other things, that other communications sent by subscribers are valid. Computer network security systems are known which allow network nodes to have several software applications that use the same security enforcement rules by having a cryptographic application which is accessible by each of the applications. For example, an e-mail application may access the cryptographic engine to encrypt e-mail messages. Likewise, a financial document generation application may also allow access to the cryptographic engine to encrypt financial documents that may be transferred over communication links.

Conventional systems typically encode security policy rules in the network nodes (eg. a subscriber unit) so that a node requires upgraded software each time a security officer changes a policy rule. Some global policies include, for example, a lifetime of a password, whether or not passwords can be reused, password length, the type of cryptographic keys allowable for a particular node, and other policies. Increasingly, information security systems are becoming larger and larger. For example, a system may include dozens or hundreds of certificate issuing units or network servers that are used to generate certificates for hundreds, thousands and even hundreds of thousands of subscribers. As know in the art, one structure for facilitating verification of certificates in trusted information security systems, includes the implementation of a rooted hierarchy. In such a trust hierarchy, the root authority (or trust authority) serves as the trusted source and signs certificates for lower tiered or subordinate certification units. The subordinate authorities act as the starting trust anchors or local authorities for a specified number of subscribers. Each subscriber then obtains a certificate signed by the local verification authority to determine whether another subscriber within the system is trusted, based on whether or not a signed certificate by a trusted authority is deemed valid by a subscriber.

However, it is desirable to provide policy control flexibility in instances where policy rules need to be changed on a per application or per subscriber basis each time, for example, a subscriber logs in to the system or for any other suitable purpose. In addition, as information security systems become more complex, differing subscribers may have differing security needs and therefore it would be desirable to have a system that is flexible in providing centralized policy rules to each subordinate unit instead of requiring each subordinate unit to know and maintain policy rules of the entire system or require the root authority to control all policy rules. As such, it would be desirable to have a root policy provider be able to delegate to subordinate certificate issuing units within the system. However, such a system should accommodate, dynamically, variations and changes in policy rules.

In addition, typical rooted hierarchies have a single anchor of trust. Each certificate issuing unit then has a corresponding certificate that is signed by the root certificate issuing unit so that the subscribers trust the signature applied by each of their anchor (local) certificate authorities. Some systems also allow cross certification by one certification authority with another certification authority so that the subscribers may more efficiently obtain verification from a subsequent certification authority where desired. However, it would be desirable to allow cross certification of outside agencies or outside nodes from the primary trust community to readily expand the operational community for subscribers. Also, the centralized policy control should also be maintained to provide a more secure system.

Consequently, there exists a need for an information security system that provides flexible policy delegation in a rooted hierarchy system to allow added certification authorities to provide policy rule information either to additional subordinate certification authorities and/or to subscribers. Such a system should allow a variation of trust anchors for a subscriber to facilitate trust adjustment to reduce compromises to a certification authority in the hierarchy. It would also be desirable if such a system employed inter-certification authority verification messages to facilitate dynamic selection of validation starting authorities among the subordinate authorities.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE PREFERRED EMBODIMENT

Briefly, an information security network provides a plurality of trusted authorities configurable in a rooted hierarchical structure. At least one of the trusted authorities is a superior authority and at least one of the trusted authorities is a subordinate authority. The trust authorities are capable of issuing digitally signed data structures, referred to as certificates. The superior authority is operative to generate policy control message data, such as separate message data or a certificate containing policy information, to dynamically vary policy control data to facilitate trust authority policy delegation among subordinate authorities. The policy control data includes, among other things, inter-trusted authority trust modification data to dynamically vary validation starting authorities among subordinate authorities.

The validation starting authorities may use signed data structures (messages, non-messages or any suitable data).

In one embodiment, at least one of the subordinate authorities includes a certificate issuer responsive to the inter-trusted authority modification data, that issues certificates for at least one subscriber based on the inter-trusted authority modification data. The inter-trusted authority modification data may fall into several categories including data pertinent among a CA and subscriber, and among subscribers. For example, the inter-trusted authority modification data may include, for example, trusted anchor modification data indicating that the trust anchor for a given subscriber may be modified. The inter-trusted authority modification data may also include, for example, data representing the scope of certification for a subordinate authority such as data representing authority cross certification allowance, whether a subordinate certification authority can create another subordinate certification authority, subordinate authority password rule data, subscriber trust anchor rule data and subscriber password rule data and any other suitable policy data. Trust anchor modification data may also include data, for example, that a superior authority passes to one or more subordinate authorities through a certificate stored in a repository, such as an X.509 repository so that the trust anchor for a given subscriber may be modified by a subordinate authority without requiring action by the superior certification authority.

Figure 1:
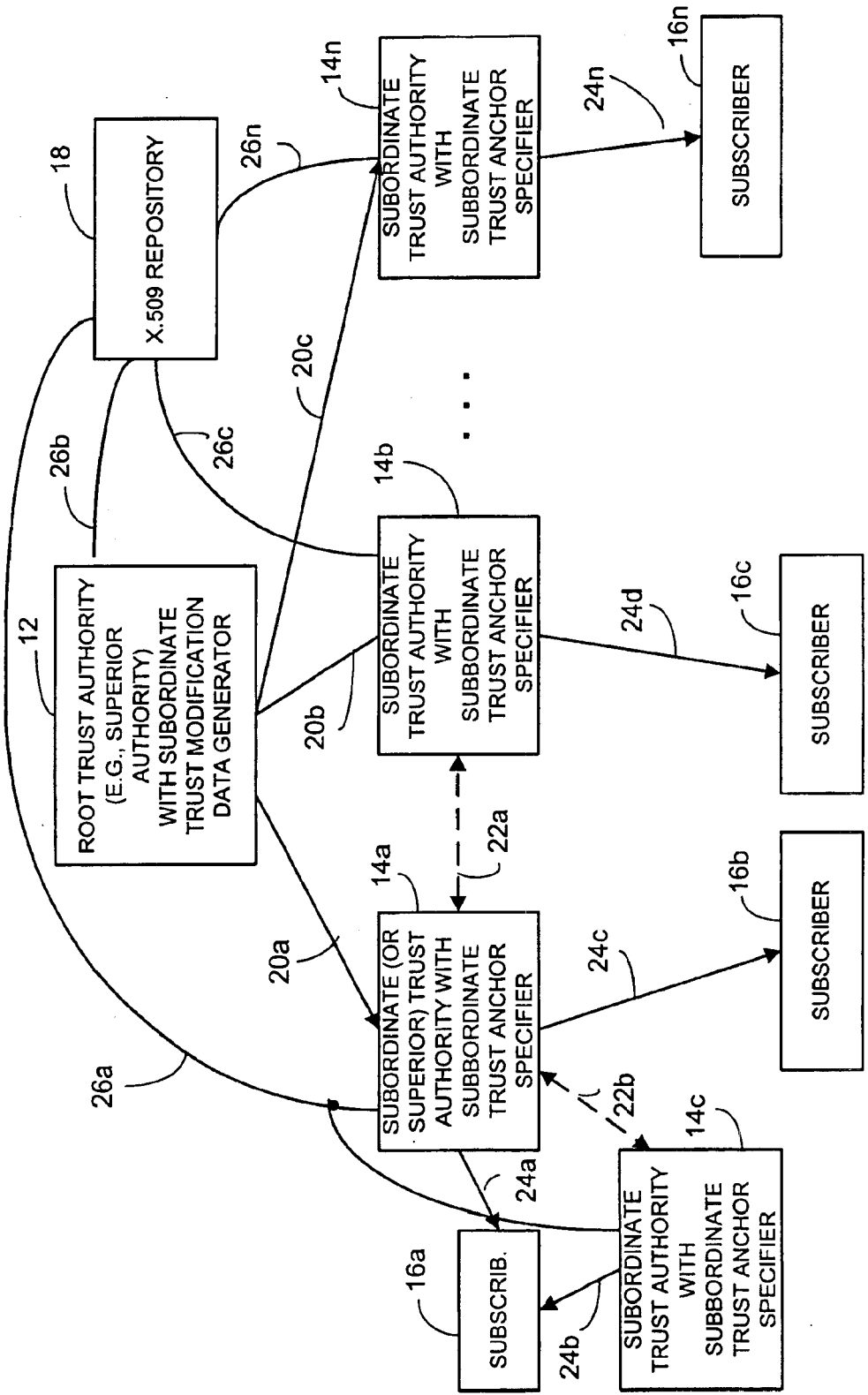
FIG. 1 is a block diagram of an information security system in accordance with one embodiment of the invention.

FIG. 1 shows an information security system 10 having a rooted hierarchical structure that includes a superior authority 12, such as a root trust authority, and a plurality of subordinate trust authorities 14a, 14b, 14n. A plurality of subscribers 16a, 16b, 16c and 16n are shown which trust a specific starting (local) authority. For example, as shown, subscriber 16b uses a subordinate trust authority 14a as an initial starting authority, meaning the trust authority 14a signs the public key certificate of the subscriber 16b. A certificate repository 18, such as an X.509 repository is also used to store the various certificates used in the system. It will be recognized however, that any suitable storage mechanism and format may be used if desired. The trust authorities may be suitably programmed processing units or any other suitable apparatus as desired. Similarly, subscribers may be any suitable program processing units or any suitable apparatus. For example, suitably programmed IBM PC's or other mobile units may be used if desired.

The superior authority 12 generates policy control message data 20a, 20b and 20c which may be in the form of a signed data structure such as an X.509 certificate or a non-signed data structure if desired. The policy control message data 20a–20c is used to dynamically vary policy control data among subordinate trust authorities to delegate policy control from the superior authority. As such, the policy control message data 20a–20c dynamically varies validation starting authorities among subordinate authorities where subordinate trust authorities use the information to change the trust anchor for a given subscriber unit. The dashed lines 22a and 22b represent that a cross certification has been authorized by the data in the policy control message data 20–20c. The lines 24a–24n represent a trust relationship initially between a subscriber and a starting trust authority. The lines 26a–26n represent communication links between the respective trust authorities and the X.509 repository to store and retrieve information stored therein, such as certificate revocation list (CRL) information and certificates. In operation, the root trust authority or superior authority 12 effectively generates data that is extracted by subordinate authorities to allow a subordinate authority to execute and define policy control. For example, the subordinate authority may be allowed to cross certify with another specified subordinate authority as dictated by the superior authority 12, thus allowing distributed control of trust anchors so that a subscriber's trust anchor changes from one CA to a different CA under control of a superior authority. In addition, the policy control message data 20a–20c may indicate that the subordinate authorities can certify other subordinate authorities or only subscribers. Other policy information that may be set forth in the policy control message data 20a–20c may be, for example, what password rules should be used by the subordinate certification authority. In addition, the subordinate trust authorities create certificates for respective subscribers and also specify, if desired, one or more trust anchors for subscribers. The mechanism to provide the policy control message data 20a–20c can take many forms, for example, the information may be published in a certificate which may include, for example, digitally signed structures including policy information and rules that should be followed by a subordinate trust authority. The certificates or information may be obtainable through a public directory or by communicating this information directly to the subordinate authority such as store and forward communication or session oriented communications, in a secure manner if desired.

Also as shown, a subordinate authority may also become a superior authority if the subordinate authority is controlling policy information for another subordinate authority. By having dynamic control and limitation of differing trust relationships, the system can employ a dynamic multi-rooted hierarchy which may include, for example, different anchors of trust. One anchor may be, for example, the starting authority or local authority which initially issues the certificate for a given subscriber. Another trust anchor for a given subscriber could be a superior CA or certification authority and the final root anchor could be the root trust authority as specified by the chain of superior signed certification authority certificates leading up to the root trust authority.

Figure 2:
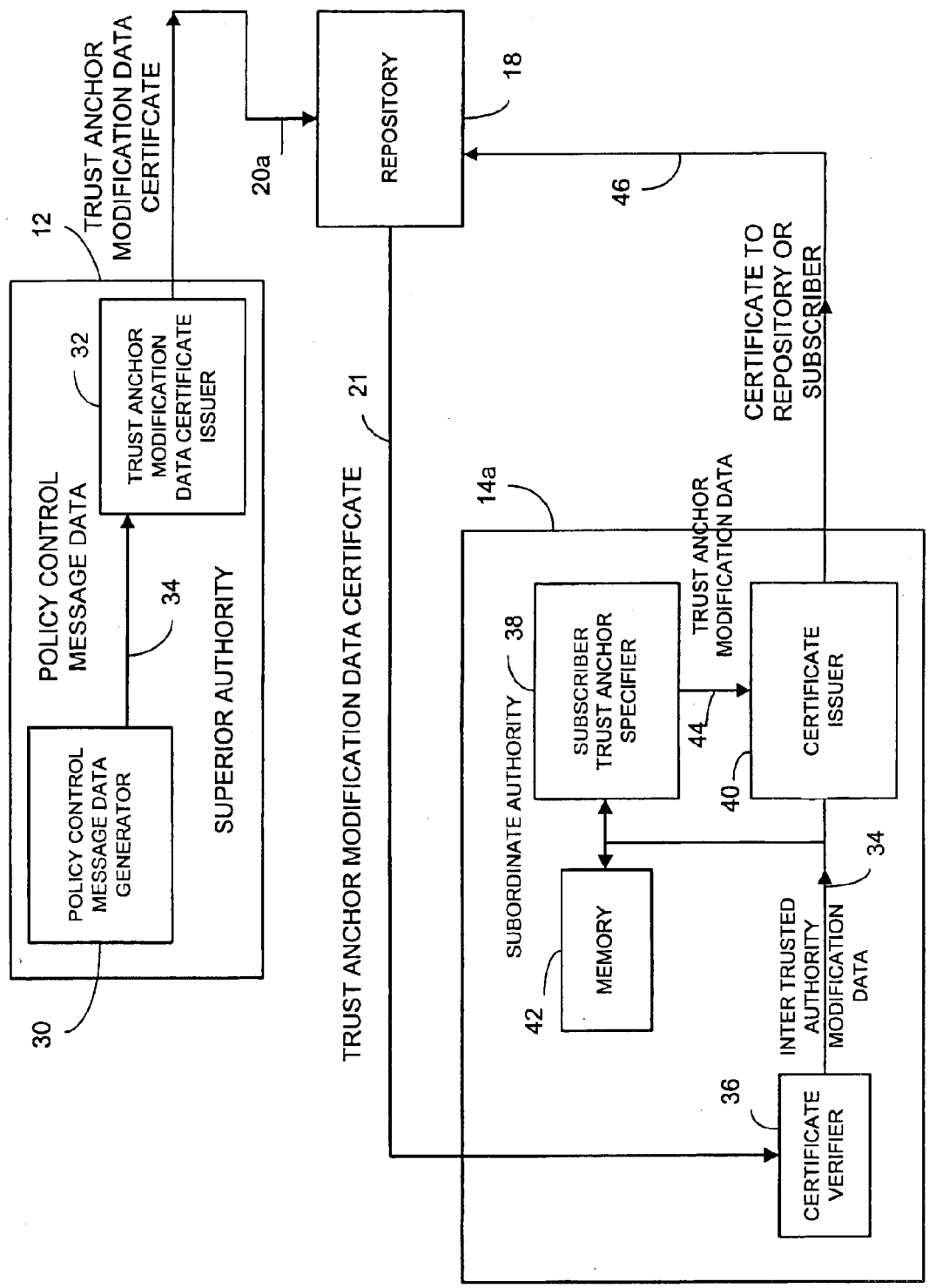
FIG. 2 is a block diagram illustrating one embodiment of a superior trust authority and a subordinate trust authority in accordance with one embodiment of the invention.

FIG. 2 shows by way of example, the superior authority 12 having a policy control message data generator 30 and a trust anchor modification data certificate issuer 32. The policy control message data generator 30 generates policy control message data 34 to control which policy data is to be delegated or communicated to a subordinate authority or a plurality of subordinate authorities. The trust anchor modification data certificate issuer 32 creates a trust anchor modification data certificate 21 which includes the signature of the superior authority 12.

The policy control message data generator 30 may be, for example, a graphic user interface that receives data from a security officer wherein the data includes policy information that the superior authority is delegating or changing for subordinate authorities. The policy control message data may be populated in a signed certificate, such as an X.509 type of certificate, the data may be written to a signed file, the data may be communicated through an email communication, or dynamically and directly from one CA to another CA, or in any suitable manner.

By way of example, and not by limitation, the following list and tables represent different types of policy control message data and data indicating when the policy data is used.

Types:
1. CA-to-CA Policy Data (CCPD)-Policy data specified by a superior CA to a subordinate CA that affects the operational behavior of a CA directly (e.g. distinguished name (DN) constraints for CA entities).

2. CA-to-CA Subscriber Policy Data (CCSPD)-Policy data specified by a superior CA to a subordinate CA that effects the operational behavior of a CA subscriber directly (e.g. DN constraints for end-entities).
3. CA Initialization Configuration (CIC) A CA policy configuration point which corresponds to the initialization of the CA. CA initialization coincides with the starting of various CA services including the very first time the services are started and any subsequent restarting of the services.
4. CA Dynamic Configuration (CDC) A CA policy configuration point which can occur anytime after initialization and while the CA is active.

The following tables break up known policy data into CCPD and CCSPD types and indicate the policy configuration points (the time when an entity typically uses the policy data).

| | CCPD | Configuration |
|---|---|---|
| 1. | Allowable CA DN | CIC/CDC |
| 2. | Allowable CA DN in cross-certificate | CIC/CDC |
| 3. | Number of Approvals for CA operation | CIC/CDC |
| 4. | Certificate Expiry intervals | CIC/CDC |
| 5. | Disable Certificate update | CIC/CDC |
| 6. | CRL lifetimes | CIC/CDC |
| 7. | Allow Administrators to issue CRLs | CIC/CDC |
| 8. | Allow revoked certificates to remain in CRL | CIC/CDC |
| 9. | Cross-certificate lifetime | CIC/CDC |
| 10. | Cross-certificate policyConstraints | CIC/CDC |
| 11. | Cross-certificate nameConstraints | CIC/CDC |
| 12. | Cross-certificate Policy OIDs | CIC/CDC |
| 13. | Cross-certificate Policy Mappings | CIC/CDC |
| 14. | CA certificate lifetime | CIC/CDC |
| 15. | CA signing key lifetime | CIC/CDC |
| 16. | CA signing key algorithm | CIC |
| 17. | CA key pair replacement grace period | CIC/CDC |
| 18. | CA key length | CIC |
| 19. | CA database encryption algorithm | CIC/CDC |
| 20. | CA database integrity algorithm | CIC |
| 21. | Allow CA services algorithm | CIC/CDC |
| 22. | CA user licence limits | CIC/CDC |
| 23. | Central Respository address | CIC/CDC |

| | CCSPD | Configuration |
|---|---|---|
| 1. | Allowable end-user DN | CIC |
| 2. | Control of ability to force new user certificates with old keys | CIC/CDC |
| 3. | User certificate hashing algorithm | CIC/CDC |
| 4. | User signature algorithm | CIC/CDC |
| 5. | User encryption algorithm | CIC/CDC |
| 6. | User encryption certificate lifetime | CIC/CDC |
| 7. | User verification certificate lifetime | CIC/CDC |
| 8. | User signing key lifetime | CIC/CDC |
| 9. | User encryption certificate policy OIDs | CIC/CDC |
| 10. | User verification certificate policy OIDs | CIC/CDC |
| 11. | User signing key algorithm | CIC/CDC |
| 12. | User key pair length | CIC/CDC |
| 13. | User epf password lifetime | CIC/CDC |
| 14. | User epf auto-logout interval | CIC/CDC |
| 15. | User email address as SubjectAltName | CIC/CDC |

Accordingly, the policy control message data may be, for example, trust anchor verification data that includes data representing subordinate authority cross certification allowance data. For example the data may indicate that one CA can cross-certify with CAs within a predefined group identified by domain names of CAs. The policy control message data may also include subordinate authority certification rule data. For example, this data may define that a CA can only certify a subordinate CAs but the subordinate CA subscribers must be high assurance users, such as users that use a large encryption key versus a smaller encryption key. Other policy control message data may include subordinate authority password rule data representing that a subordinate CA operator must use minimum length passwords of 10 characters and also use hardware tokens for authentication. Policy control message data may also include subscriber trusted anchor rule data that represents data indicating that a subscriber must use the root CA public verification key when validating all certificates; or a subscriber must use the root CA public verification key as the anchor of trust (starting point) when validating all certificates, except when validating subscribers who belong to a subscribers local CA. The policy control message data may further include subscriber password rule data indicating that subscribers must only use minimum 8 character passwords or other password related criteria. Other policy control data may also include certificate expiry policy such as requiring all users within the subordinate CA must be issued certificates that expire after a maximum of two years, subscriber algorithm policy (i.e. all operators and subscribers of this subordinate CA must use the RSA 1024-bit algorithm for signing and the RSA 2048-bit algorithm for encrypting, subordinate authority algorithm policy (i.e. all subordinate CAs must use the RSA 2048-bit algorithm for their subordinate CA signing key pair) and other policy data. Also, policy control message data may include administration policy data certificate revocation list policy data, such as data controlling the publishing schedules of certificate revocation lists The trust anchor inter-modification data certificate issuer 32 generates the trust anchor modification data certificate 21 by applying a digital signature to the policy control message data and also includes standard certificate information, such as expiry data and other suitable data. The trust anchor modification data certificate may be generated as a type of X.509 certificate but with the inter-trusted authority trust modification data as a data component. The superior authority 12 then publishes the trust anchor modification data certificate 21 in the repository 18. Alternatively, the superior authority may directly communicate the change in policy information to the requisite subordinate authority if desired.

The subordinate authority 14a includes a certificate verifier 36, a subscriber trust anchor specifier 38, a certificate issuer 40 and memory 42. The subordinate authority 14a periodically checks the repository to determine whether or not the trust anchor modification data certificate is present for that specified authority. A specified authority may determine this based on subordinate authority identification data stored in the certificate by the superior authority. However, it will be recognized that any suitable mechanism may also be used.

The certificate verifier 36 performs standard certificate verification on the trust anchor modification data certificate obtained from the repository. The certificate verifier 36 may check the digital signature of the superior authority that is placed on the trust anchor modification data certificate along with the requisite certification revocation list to determine whether the trust anchor modification data certificate that was retrieved is valid. If the certificate is valid, the inter-trusted authority modification data (policy control message data) is then retrieved. This data is as shown as data 34. A copy of this data is stored in memory 42. For example, where this data indicates that the subordinate authority may cross certify or create another subordinate authority, the inter-trusted authority modification data 34 is stored so that the authority knows what is approved policy. Where the inter-trusted authority modification data 34 indicates a new validation starting authority, the subscriber trust anchor specifier 38 analyzes which subordinate authority has been indicated as the new trust anchor and generates the trust anchor modification data 44 to indicate a new trust anchor for a given subordinate authority or subscriber as desired. Whether the trust anchor is for another subordinate authority or subscriber may be indicated by the superior authority in the inter-trusted modification data.

When the trust anchor changes the certificate issuer 40 generates a new certificate with a signature of the subordinate authority 14*a* for a new subscriber and stores the new certificate 46 in the repository. The subscriber may then treat the subordinate authority 14*a* as a new starting authority or local authority. The trust anchor modification data represents a trust anchor different from a local trust authority. In other words, the subordinate authority 14*a* may have been a local trust authority or starting trust authority for a given subscriber, the subordinate authority may then indicate that it is a trust anchor for another subscriber or that it is a trust authority for another subordinate authority if desired. A subscriber trust anchor generates the trust anchor modification data to also include identification data of the subscribers being affected by the change or the subordinate authority being created or also affected by the change. In this way, respective subordinate authorities and subscribers may scan or review the certificates in the repository and retrieve those that pertain directly to them.

The trusted authority modification data 34 is stored in memory 42 based on the receipt of the trust anchor modification data certificate and its subsequent verification.

Figure 3:
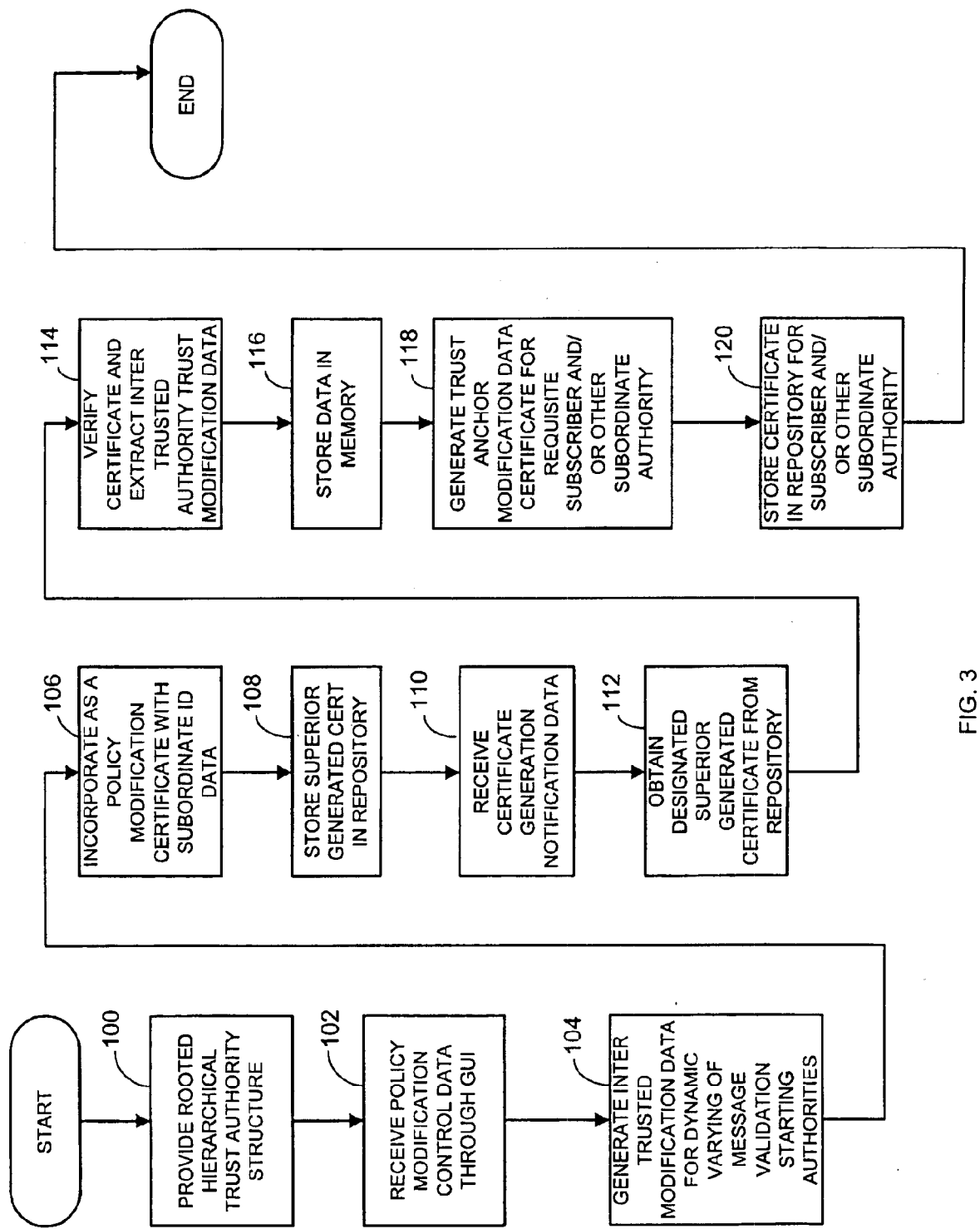
FIG. 3 is a flow chart illustrating the operation of the system shown in FIG. 2.

FIG. 3 illustrates by way of example one method of operation of the system. Referring also to FIG. 2 and as shown in block 100, a rooted hierarchical trust authority structure is provided which includes a root trust authority as well as a plurality of subordinate authorities. The subordinate authorities serve as a trust anchor for various subscribers. The root authority also serves as a trust anchor since the certificate generated by the root authority is trusted by all subscribers in the system. The superior authority as shown by block 102, receives policy modification control data through the graphic user interface that may be provided through the policy control message generator 30. The superior authority 12 generates inter-trusted modification data 34 by incorporating it in a trust anchor modification data certificate 20*a*. This facilitates the dynamic varying of validation starting authorities for subordinate authorities and/or other subscribers. This is shown in block 104. The inter-trusted modification data may be, for example, the policy control message data. The trust anchor modification certificate issuer 32 incorporates this information into the trust anchor modification data certificate as shown in block 106. As shown in block 108, this information is stored by the superior authority in the repository. On a periodic basis, for example, during each session between a subscriber and a CA, each subordinate authority in the system retrieves the certificates for their respective authority.

Alternatively, after initialization, as shown in block 110, the superior authority may generate modification data in the form of a message to a particular subordinate authority (or authorities) to indicate that a change in policy would be occurring. The subordinate authority, as shown in block 112, obtains the designated generated certificate from the repository and verifies the signature on the certificate as shown in block 114. If the signature verified in the certificate has not been revoked, the system extracts the inter-trusted data modification data from the certificate and then stores a copy of this data in memory as shown in block 116. Based on the type of inter-trusted authority modification data, the subscriber trusted anchor specifier 38 may specify a new trust anchor for a new subordinate authority or subscriber unit and indicate this as trust anchor modification data 44. The subordinate authority then generates the trust anchor modification data certificate 46 using the certificate issuer 40 as shown block 118. As shown in block 120, the trust anchor modification data certificate is then stored in repository 18 for retrieval by a suitable subscriber or other subordinate authority as shown in block 120. Alternatively, the system may generate messages for subordinate authorities.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An information security system comprising:

a plurality of trusted authorities configurable in a rooted hierarchical structure including at least one of the trusted authorities being a superior authority and at least one of the trusted authorities being subordinate authority;

the superior authority operative to generate inter trusted authority trust modification data, as policy control message data, to dynamically vary validation starting authorities among the subordinate authorities; and wherein at least one of the subordinate authorities includes a certificate issuer operatively responsive to the inter trusted authority modification data for issuing certificates for at least one subscriber based on the inter trusted authority modification data.

2. The system of claim 1 wherein the trust anchor modification data includes subordinate trust anchor data representing at least one trust anchor different from a local trust authority.

3. The system of claim 1 wherein the superior authority includes a trust anchor modification data certificate issuer that provides trust anchor modification data as a signed data structure for the subordinate authorities.

4. The system of claim 1 wherein the trust anchor modification data includes data representing at least one of: scope of certification data, subordinate authority cross-certification allowance data, subordinate authority certification rule data, subordinate authority password rule data, subscriber trust anchor rule data and subscriber password rule data, certificate expiry policy, subscriber algorithm policy, and policy control message data.

5. The system of claim 1 wherein one of the trusted authorities is a root authority.

6. The system of claim 1 including subordinate authority memory containing data representing validation starting authority data, wherein the data is stored in response to receiving the inter trusted authority trust modification data.

7. An information security system comprising:

a plurality of trusted authorities configured in a rooted hierarchical structure including at least one of the trusted authorities being a superior authority and at least one of the trusted authorities being a subordinate authority;

the superior authority operative to generate policy control message data to dynamically vary policy control data to facilitate trust authority policy delegation among the subordinate authorities wherein the policy control data includes inter trusted authority trust modification data to dynamically vary validation starting authorities among the subordinate authorities; and wherein at least one of the subordinate authorities includes a certificate issuer operatively responsive to the inter trusted authority modification data for issuing certificates for at least one subscriber based on the inter trusted authority modification data and further includes a subscriber trust anchor specifier, operatively responsive to the inter trusted authority modification data, that generates trust anchor modification data for a plurality of subscribers.

8. The system of claim 7 wherein the trust anchor modification data includes subordinate trust anchor data representing at least one trust anchor different from a local trust authority.

9. The system of claim 8 herein the superior authority includes a trust anchor modification data certificate issuer that provides the trust anchor modification data as a signed data structure for the subordinate authorities.

10. The system of claim 7 wherein the trust anchor modification data includes data representing at least one of: scope of certification data, subordinate authority cross-certification allowance data, subordinate authority certification rule data, subordinate authority password rule data, subscriber trust anchor rule data and subscriber password rule data, certificate expiry policy, subscriber algorithm policy, and policy control message data.

11. The system of claim 10 wherein one of the trusted authorities is a root authority.

12. The system of claim 11 including subordinate authority memory containing data representing validation starting authority data, wherein the data is stored in response to receiving the inter trusted authority trust modification data.

13. A method for providing information security comprising:

providing a plurality of trusted authorities configurable in a rooted hierarchical structure including at least one of the trusted authorities being a superior authority and at least one of the trusted authorities being a subordinate authority;

generating inter trusted authority trust modification data to dynamically vary validation starting authorities among the subordinate authorities; and the subordinate authority, in response to the inter trusted authority trust modified data, change as a trust anchor for a subscriber unit and including issuing certificates for the subscriber unit based on the inter trusted authority modification data.

14. The method of claim 13 including generating trust anchor modification data for a plurality of subscribers.

15. The method of claim 14 wherein the trust anchor modification data includes subordinate trust anchor data representing at least one trust anchor different from a local trust authority.

16. The method of claim 13 including the step of providing the trust anchor modification data as a signed data structure for the subordinate authorities.

17. The method of claim 13 wherein the trust anchor modification data includes data representing at least one of: scope of certification data, subordinate authority cross-certification allowance data, subordinate authority certification rule data, subordinate authority password rule data, subscriber trust anchor rule data and subscriber password rule data, certificate expiry policy, subscriber algorithm policy, and policy control message data.

18. The method of claim 13 including the step of storing data representing validation starting authority data, in response to receiving the inter trusted authority trust modification data.

* * * * *